United States Patent
Hammerschmidt et al.

(10) Patent No.: US 9,477,778 B2
(45) Date of Patent: Oct. 25, 2016

(54) XML QUERY OPTIMIZATION WITH ORDER ANALYSIS OF XML SCHEMA

(75) Inventors: Beda Christoph Hammerschmidt, San Carlos, CA (US); Zhen Hua Liu, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1183 days.

(21) Appl. No.: 12/545,737

(22) Filed: Aug. 21, 2009

(65) Prior Publication Data

US 2011/0047143 A1    Feb. 24, 2011

(51) Int. Cl.
*G06F 17/30* (2006.01)

(52) U.S. Cl.
CPC .............................. *G06F 17/30935* (2013.01)

(58) Field of Classification Search
USPC ................ 707/607, 687, 705, 790, 791, 802
See application file for complete search history.

(56) References Cited

U.S. PATENT DOCUMENTS

| | | | | |
|---|---|---|---|---|
| 6,785,673 | B1 * | 8/2004 | Fernandez | G06F 17/2247 |
| 7,398,265 | B2 * | 7/2008 | Thusoo | G06F 17/2205 |
| 2006/0179068 | A1 * | 8/2006 | Warner | G06F 17/30917 |
| 2009/0287670 | A1 * | 11/2009 | Hou | G06F 17/30932 |

OTHER PUBLICATIONS

Fallside, D. et al., "XML Schema Part 0: Primer Second Edition" downloaded from the Internet on Dec. 11, 2009 < http://www.w3.org/TR/xmlschema-0/ > 68 pages.

Berglund, A. et al., "XML Path Language (XPath) 2.0" downloaded from the Internet on Dec. 11, 2009 < http:/www.w3.org/TR/xpath20/ > 108 pages.

* cited by examiner

*Primary Examiner* — Sana Al Hashemi
(74) *Attorney, Agent, or Firm* — Hickman Palermo Becker Bingham LLP; Daniel D. Ledesma

(57) ABSTRACT

Techniques for determining whether an XML query may be written are provided. In one scenario, an XML query includes an expandable path, which is a path expression that includes a wildcard character (*) or a descendant axis (//). An XML schema is used to generate multiple expanded paths (each of which is a simple path expression) from the expandable path. The XML schema is used to compare each expanded path to another expanded path and to determine whether the nodes identified by the respective expanded paths are guaranteed to occur in a particular order in XML documents that conform to the XML schema. In another scenario, an XML query includes an order operator that takes two paths as input. Similarly, an XML schema is used to compare the two paths and to determine whether the nodes identified by the two paths are guaranteed to occur in a particular order in XML documents that conform to the XML schema.

24 Claims, 2 Drawing Sheets

XML QUERY OPTIMIZATION WITH ORDER ANALYSIS OF XML SCHEMA

FIELD OF THE INVENTION

The present invention relates to determining whether to rewrite XML queries that contain certain path expressions.

BACKGROUND

The Extensible Markup Language (XML) is the standard for data and documents that is finding wide acceptance in the computer industry. XML describes and provides structure to a body of data, such as a file or data packet, referred to herein as a XML entity. The XML standard provides for tags that delimit sections of a XML entity referred to as XML elements. Each XML element may contain one or more name-value pairs referred to as attributes. The following XML Segment A is provided to illustrate XML.

---
SEGMENT A

<book>My book
  <publication publisher="Doubleday"
    date="January"></publication>
  <Author>Mark Berry</Author>
  <Author>Jane Murray</Author>
</book>

---

XML elements are delimited by a start tag and a corresponding end tag. For example, segment A contains the start tag "<Author>" and the end tag "<Author>" to delimit an element. The data between the elements is referred to as the element's content. In the case of this element, the content of the element is the text data 'Mark Berry.'

Element content may contain various other types of data, which include attributes and other elements. The 'book' element is an example of an element that contains one or more elements. Specifically, 'book' contains two elements: 'publication' and 'author.' An element that is contained by another element is referred to as a descendant of that element. Thus, elements 'publication' and 'author' are descendants of element 'book.' An element's attributes are also referred to as being contained by the element.

By defining an element that contains attributes and descendant elements, the XML entity defines a hierarchical tree relationship between the element, its descendant elements, and its attribute. A root node and a set of elements that descend from the root node are referred to herein as a XML document.

XML Data Models

An important standard for XML is the XQuery 1.0 and XPath 2.0 Data Model. (see W3C Working Draft, 29 Oct. 2004), which is incorporated herein by reference and referred to hereinafter as the XQuery Data Model.

One aspect of the XQuery Data Model is that XML data is represented by a hierarchy of nodes that reflects the hierarchical nature of the XML data. A hierarchy of nodes is composed of nodes at multiple levels. The nodes at each level are each linked to one or more nodes at a different level. Each node at a level below the top level is a child node of one or more of the parent nodes at the level above. Nodes at the same level are sibling nodes. In a tree hierarchy or node tree, each child node has only one parent node, but a parent node may have multiple child nodes. In a tree hierarchy, a node that has no parent node linked to it is the root node, and a node that has no child nodes linked to it is a leaf node. A tree hierarchy has a single root node.

In a node tree that represents a XML document, a node can correspond to an element, the child nodes of the node correspond to an attribute or another element contained in the element. The node may be associated with a name and value. For example, for a node tree representing the element 'book,' the name of the node associated with element 'book' is 'book,' and the value is 'My book'. For a node representing the attribute 'publisher,' the name of the node is 'publisher' and the value of the node is 'Doubleday'.

For convenience of expression, elements and other parts of a XML document are referred to as nodes within a tree of nodes that represents the document. Thus, referring to 'My book' as the value of the node with name book is just a convenient way of expressing the value of the element associated with node 'book' is 'My book.'

XML Schemas

Information about the structure of specific types of XML documents may be specified in documents referred to as "XML schemas". For example, the XML schema for a particular type of XML document may specify element definitions and type definitions. XML documents that conform to an XML schema may be referred to as XML schema instances or simply XML instances. Standards governing XML schemas include XML Schema, Part 0, Part 1, Part 2, W3C Recommendation, 2 May 2001, the contents of which are incorporated herein by reference, XML Schema Part 1: Structures, Second Edition, W3C Recommendation 28 Oct. 2004, the contents of which are incorporated herein by reference, and XML Schema Part 2: Datatypes Second Edition, W3C Recommendation 28 Oct. 2004, the contents of which incorporated herein by reference.

XML Storage Mechanisms

Various types of storage mechanisms are used to store a XML document. One type of storage mechanism stores a XML document as a text file in a file system.

Another type of storage mechanism uses object-relational database systems that are enhanced to store and process queries for collections of XML documents. Furthermore, these object-relational database systems can store and manage XML documents as XML schemas instances. To store and manage the XML documents in a database system, database representations, defined in terms of data types handled by the database system (referred to herein as database types) are used to represent XML documents. Database types include, for example, native database types, such as integer and VARCHAR ("variable length character string"), or object types defined for a database system using data definition language (DDL) statements.

For example, a database representation of an entire XML document may be one or more tables whose columns store an element of XML documents. A database representation may be a hierarchy of objects in an object-relational database; each object is an instance of an object class and stores one or more elements of an XML document. The object class defines, for example, the structure corresponding to an element, and includes references or pointers to objects representing the immediate descendants of the element.

One technique for mapping XML schemas to object-relational (O-R) storage is described in U.S. Pat. No. 7,069,224, entitled "Mechanism for Mapping XML Schemas to Object-Relational Database Systems," granted on Aug. 22, 2006, and which is incorporated by reference as if fully set forth herein. According to O-R storage, XML documents are "shredded" into different tables and columns of a relational database. Relational access mechanisms, such as SQL, are used to access the XML data. The relational schema (the tables, columns, and their relationships) is mapped from an XML schema that restricts the structure of XML documents that conform to the XML schema. A relational database may store XML documents that conform to multiple XML schemas. In other words, a relational database may store (a) XML data from one or more XML documents that conform to XML schema A and (b) XML data from one or more XML documents that conform to XML schema B.

XML Query Rewrite

When rewriting an XML query (whether an XQuery query or a SQL/XML query) to an equivalent SQL query, the order of the selected XML fragments generally must be preserved. For example, if the XML query selects chapters in a book, then the query can only be rewritten in such a way that the chapter's sequential order is preserved. If the rewritten query would harm the order of the chapters (e.g., Chapter 5 would appear before Chapter 4), then the rewritten query should not be used as a replacement for the original query. Thus, query execution of the original query might not be able to use a relational access path even if the targeted XML data is stored in O-R storage. Instead, query execution of the original query might rely on more expensive functional evaluation, which entails XML document/fragment generation and traversal, such as recreating one or more XML documents from the "shredded" relational XML data. It can be straight forward to rewrite XML queries with only simple path expressions that only select one table-column pair such that the rewritten queries preserve the order of nodes as the nodes appear in the original XML document(s).

However, if an XML query includes a path expression that involves more than one table and/or column, then rewriting the XML query might result in a rewritten query whose result does not preserve the order of nodes as those nodes appeared in the original XML document(s). Such path expressions are referred to herein as "expandable paths." Expandable paths typically contain a wildcard character (*), a descendant axis (//), or an 'OR.' Expandable paths may potentially select more than one element type.

During an XML query rewrite phase, an expandable path may be expanded to one or more simple path expressions (referred to herein as "expanded paths") that each only selects one element type and, thus, one table-column pair. Multiple expanded paths may need to be processed in a way that the combined result is the same as the functional evaluation of the original query. In other words, the exact order of nodes may need to be preserved. For example, an XML query includes the expandable path "//item" and selects all 'item' nodes. This expandable path may be expanded to generate expanded paths "/site/region/Africa/item," "/site/region/Asia/item," and "/site/region/Europe/item." When the nodes identified by these expanded paths are stored object-relationally in a database, no order between the 'Africa,' 'Asia,' and 'Europe' nodes are preserved. However, a user typically wants to view the 'item' nodes in the same order in which the 'item' nodes appear in an XML document. Therefore, processing the expanded paths individually and combining the results may not result in the 'item' nodes appearing in the same order as the 'item' nodes in the original XML document.

Because processing multiple expanded paths does not necessarily preserve the order of certain nodes in the original XML document(s), the original expandable path should not be expanded. Thus, there is a need to determine whether expanding an expandable path is a valid optimization or whether expansion harms the order of returned nodes and, therefore, should not be performed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
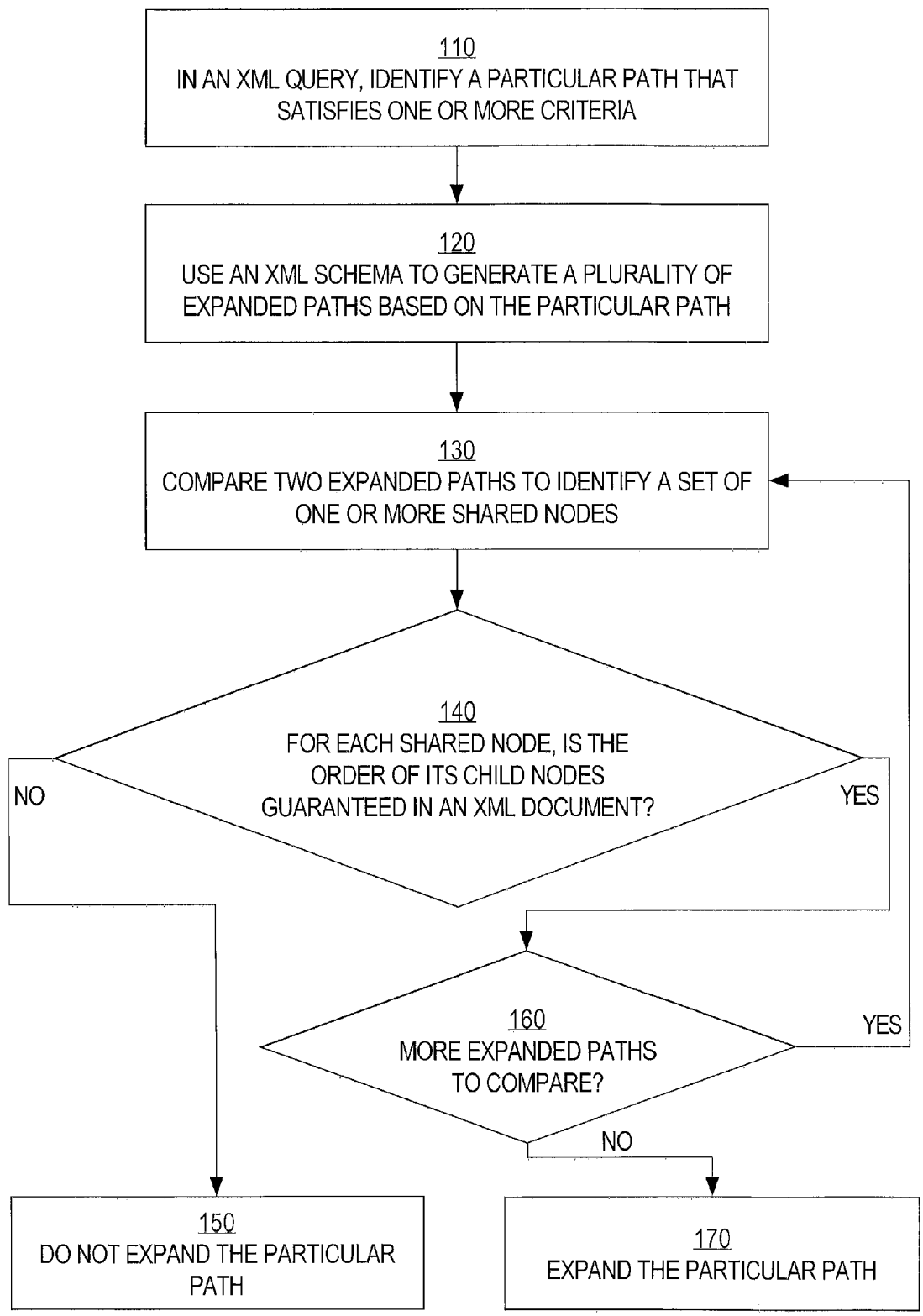
FIG. 1 is a flow diagram that depicts a process for determining whether an XML query may be optimized with path expansion of a particular path in the XML query, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In response to receiving an XML query, a database server determines that the XML query includes a path expression that (a) targets XML data that is stored object-relationally and (b) include a descendant axis (//), a wildcard (*), or an OR. The database server determines whether expansion of such an expandable path is a valid optimization for the XML query. Path expansion is valid only if the order of returned XML data that is targeted by the expandable path can be guaranteed to be the same as the order of the corresponding XML data in the original XML document(s). Path expansion is not valid otherwise. For purposes of brevity, this particular order guarantee is referred to hereinafter as a "guaranteed order" or derivations thereof.

The database server may perform one or more checks before determining whether path expansion is valid, i.e., whether the order of targeted XML data can be guaranteed. For example, the database server may determine the context of an expandable path within the XML query. If the context of the expandable path indicates that the order of the XML data is irrelevant, then determining whether path expansion of that expandable path is valid is not necessary and the XML query may be rewritten to include the expanded paths instead of the expandable path.

As another example, the database server may first determine the total size of XML document(s) that contain XML data that the XML query targets. If the total size is below a particular threshold, then the database server does not expand the expandable path. Instead, the database server generates a textual XML document or a DOM tree based on the underlying XML data that is stored object-relationally.

As another example, the database server may determine the number of expanded paths that would result from path expansion of an expandable path. If the number exceeds a particular threshold, then the database server does not expand the expandable path.

For purposes of brevity, "path" may be used synonymously with "path expression."

A "simple path" is a path that identifies only parent-child relationships among elements in the path and begins with the root node, e.g., "/." For example, "/site/region/Africa/item" and "/site/region/" are simple paths whereas "//item" and "/site/region/*/item" are not simple paths.

Further, even though the following description describes the use of an XML schema, embodiments of the invention also apply to scenarios where a Document Type Definition (DTD) is used to define the structure of an XML document instead of an XML schema.

Process Overview

FIG. 1 is a flow diagram that depicts a process for determining whether an XML query may be optimized with path expansion of a particular path in the XML query, according to an embodiment of the invention.

At step 110, in an XML query, a particular path that satisfies one or more criteria is identified. The one or more criteria may be whether the particular path contains a wildcard (*), the descendant axis (//), or an OR operator (|). The one or more criteria may be whether the particular path involves more than one table and/or column. Non-limiting examples of such a particular path (referred to herein as an "expandable path") include "//item," "/site/*/item," "/site/region/*," and "/site/region/[Africa|Asia]/item."

At step 120, an XML schema associated with the expandable path is used to generate a plurality of expanded paths based on the particular path. Each expanded path includes the same order of element(s) in the expandable path. For example, according to an XML schema, the particular path "//item" might correspond to the following three expanded paths "/site/region/Asia/item," "/site/region/Europe/item," and "/site/region/NorthAmerica/item." All 'Asia' items may be stored in one table, all 'Europe' items may be stored in another table, and all 'NorthAmerica' items may be stored in yet another table.

At step 130, two expanded paths are compared to identify a set of one or more shared schema nodes. A "schema" node is a node in an expanded path. A schema node is "shared" if the schema node appears in the two expanded paths being compared. Given the three example expanded paths above, the shared schema nodes are "/site" and "/site/region."

At step 140, for each shared schema node, it is determined whether an order of the child nodes of the shared schema node can be guaranteed in an XML document. This determination is made by analyzing the content model, of the shared schema node, found in the XML schema. A content model of a particular node defines the structure of the particular node and the hierarchical relationship between the particular node and one or more other nodes. For example, the content model of a particular node may define the order in which the child node(s) of the particular node may appear in an XML document.

If the content model of at least one shared schema node indicates that the child nodes of the shared schema node are not guaranteed to appear in a particular order in each XML document that conforms to the XML schema, then the process proceeds to step 150, where it is determined to not expand the particular path.

However, if the content model of each shared schema node indicates that the child nodes of the shared schema node are guaranteed to appear in a particular order in each XML document that conforms to the XML schema, then the process proceeds to step 160. At step 160, it is determined whether each expanded path of the plurality of expanded paths has been compared to each other expanded path of the plurality of expanded paths. If not, then the process returns to step 130. Otherwise, the process proceeds to step 170, where it is at least determined that the particular path may be expanded. Further checks may be performed to determine whether the particular path should be expanded.

Analyze the XML Schema for Possible Path Expansion

As noted above, one of the optimizations of an XML query is to determine whether the XML query may be rewritten even though the XML query contains an expandable path. Also as noted above, a current technique for handling the scenario where an XML query includes an expandable path is to not rewrite the XML query by expanding the expandable path and generating a rewritten query that includes multiple expanded paths based on the expandable path. However, according to embodiments of the invention, an XML query that includes an expandable path may be rewritten to include multiple expanded paths. In order to make the determination to rewrite an XML query in this manner, an XML schema is analyzed. The expandable path "//path" is used to illustrate how an XML schema is analyzed.

First, as noted above, an expandable path is identified in an XML query. Then, an XML schema is analyzed to determine a plurality of expanded paths based on the expandable path. For example, given "//item" as the expandable path, the XML schema is analyzed to determine to the following expanded paths: "/site/region/Africa/item," "/site/region/Asia/item," "/site/region/Europe/item," and "/site/region/NorthAmerica/item."

Content Model

Next, the XML schema is used to determine whether nodes identified by expanded paths appear in a well-defined order. The nodes identified by expanded paths are referred to herein as "selected nodes." Selected nodes "/site/region/Africa/item" and "/site/region/Asia/item" are in order if all of their respective occurrences within each XML document always appear in a well-defined order, such as all "/site/region/Africa/item" nodes before "/site/region/Asia/item" nodes or all "/site/region/Asia/item" nodes before "/site/region/Africa/item" nodes. In order to detect this order, the content model of each shared schema node is examined. A content model of a node defines how child nodes may appear under the node. Valid content models include 'SEQUENCE,' 'CHOICE,' and 'ALL' as defined in the XQuery standard.

If the content model of a shared schema node is 'ALL,' then no order information can be derived from the XML schema because any order of child nodes in this content model is valid. If the content model of a shared schema node is 'SEQUENCE' then each child node of the shared schema node is in a well-defined order. If the content model of a shared schema node is 'CHOICE,' then the children nodes of the shared schema node cannot both appear in a single XML document. Thus, ordering becomes irrelevant. However, the order of the child nodes of a shared schema node can be guaranteed to be preserved when the content model indicates 'SEQUENCE' or 'CHOICE' only if the content model cannot be used repeatedly. In other words, the maximum occurrence of each shared schema node is one. The maximum occurrence is defined by the 'maxOccurs' attribute in an XML schema.

The maximum number of times an element may appear is determined by the value of a 'maxOccurs' attribute in the elements declaration. This value may be a positive integer (e.g., 41), or the term 'unbounded' to indicate there is no maximum number of occurrences. The default value for the 'maxOccurs' attribute is 1. Thus, when an element is declared without a 'maxOccurs' attribute, the element may not occur more than once. If a value is specified for only the 'maxOccurs' attribute (i.e., and not the 'minOccurs' attribute), then the value of the maxOccurs' attribute must be greater than or equal to the default value of the 'minOccurs' attribute (which default value is 1). If the 'minOccurs' and 'maxOccurs' attributes are omitted from an element's declaration, then the element must appear exactly once.

If a 'SEQUENCE' or 'CHOICE' could occur multiple times, then the order of its child nodes could not be guaranteed to be preserved after extracting the XML data identified by the selected nodes. This situation where a 'SEQUENCE' or 'CHOICE' could occur multiple times may be written as the regular expression "(A, B)*" for SEQUENCE and "(A|B)*" for CHOICE.

The following is an example of a possible content model for the "/site/region" node:

```
<xsd:complexType name="region">
    <xsd:sequence maxOccurs="2">
        <xsd:element name="Africa" type="xsd:string"/>
        <xsd:element name="Asia" type="xsd:string"/>
        <xsd:element name="Europe" type="xsd:string"/>
        <xsd:element name="NorthAmerica" type="xsd:string"/>
    </xsd:sequence>
</xsd:complexType>
```

This example defines a sequence of elements starting with Africa and ending with North America. The sequence implies a well-defined order of the elements. But because the sequence can occur multiple times, ordering among sequences is not guaranteed: Assuming that an instance documents would contain two occurrences of that sequence we would find two instances of 'Africa' in a column of a table. It is not possible to know which instance of 'Africa' comes first by just examining the table.

As another example, given the four expanded paths above, suppose the content model of shared schema node 'region' is 'CHOICE' and the 'maxOccurs' attribute, for one or more of the child nodes of the 'region' node, indicates a value greater than 1. That means that a single XML document will contain at least one of a "/site/region/Africa" node, a "/site/region/Asia" node, a "/site/region/Europe" node, or a "/site/region/NorthAmerica" node. For the purposes of illustration, suppose the node is a "/site/region/NorthAmerica" node. However, the "/site/region/NorthAmerica" node may then be followed by another sibling node, such as a "/site/region/Africa" node, a "/site/region/Asia" node, a "/site/region/Europe" node, or another "/site/region/NorthAmerica" node. The order of these nodes cannot be guaranteed to be preserved in at least a partial result of executing the XML query. Therefore, a functional evaluation of the original XML query would be required, which would entail constructing the underlying XML document(s) so that the original XML query could be executed against the XML document(s).

Therefore, if the content model of each shared schema node indicates either 'SEQUENCE' or 'CHOICE' and the 'maxOccurs' attribute is less than or equal to one, then the selected nodes will be in order. For example, if the "/site" and "/site/region" nodes both satisfy these two conditions, then the selected nodes (i.e., "/site/region/Africa/item" and "/site/region/Asia/item") are guaranteed to appear in the same order as they appeared in the original XML document(s).

An example of analyzing the content model of one or more shared schema nodes is the following. Given the four expanded paths above (derived from the appropriate XML schema), the shared schema nodes are determined to be "/site" and "/site/region." The content model of at least one of the "/site" node or the "/site/region" node is then determined. If the content model of the "/site" node is 'ALL,' then no further analysis of the corresponding 'maxOccurs' attribute and the content model of the "/site/region" node is required. Such further analysis is not required because the order of child nodes of the "/site" node cannot be guaranteed to be preserved in at least a partial result of the XML query. However, if the content model of the "/site" node is 'SEQUENCE' or 'CHOICE,' then the maximum occurrence of each child node is determined. If the maximum occurrence of each child node is one or less, then the order of the child nodes can be guaranteed to be preserved in the final result of the XML query. If the child nodes of the "/site" node can be guaranteed to be preserved, then the content model of the "/site/region" is determined.

If the content model of the "/site/region" node is 'ALL,' then no further analysis of the corresponding 'maxOccurs' attribute is required. Such further analysis is not required because the order of child nodes of the "/site/region" node cannot be guaranteed to be preserved in at least a partial result of the XML query. However, if the content model of the "/site/region" node is 'SEQUENCE' or 'CHOICE,' then the maximum occurrence of each child node is determined. If the maximum occurrence of each child node is one or less, then the order of the child nodes can be guaranteed to be preserved in the final result of the XML query.

The content model of each non-shared schema node is not required to be known. For example, the selected nodes cannot be shared nodes because the paths are different. Selected nodes have no restriction concerning their maximum occurrence. A regular expression representing this situation may be (A*,B*). A user who defines an XML Schema is encouraged to use (A*,B*) instead of (A,B)* whenever possible when defining order between any two nodes A and B.

If the content model of the bottom-most shared schema node is a 'SEQUENCE,' then it is determined which selected node is first relative to the other selected node. This determination is performed by (again) analyzing the content model for the bottom-most shared schema node, which content model defines that order of its child nodes. If the content model of the bottom-most shared schema node is 'SEQUENCE,' then the two expanded paths will take different branches into child nodes and the order of the branches defines the order of the selected nodes. For example, if 'Africa' is always before 'Asia,' then the content model of the 'region' node will define 'Africa' as always being before 'Asia.'

It is important to note that the above-described technique takes multiple path expressions and an XML schema as input without requiring the actual XML data that is the target of the original XML query. Therefore, evaluation of actual XML data stored in tables is not required.

In an embodiment, the analysis of the content model of each shared schema node returns one of four possible values indicating (where A and B are selected nodes): "A before B," "B before A," "no order between A and B," and "order irrelevant." If ordering between selected nodes A and B is guaranteed ("A before B" or "B before A") or if the ordering between selected nodes A and B is irrelevant ("order irrelevant"), then an expandable path may be expanded into multiple expanded (i.e., simple) paths that are part of a rewritten query. If ordering between selected nodes A and B cannot be guaranteed (i.e., "no order between A and B"), then the expandable path should not be expanded because the document order between selected nodes A and B cannot be preserved.

Analyze Context of Path

In an embodiment, the context in which an expandable path appears in an XML query is analyzed to determine whether the expandable path should be expanded. Although this analysis may be made after it is determined whether an expandable path should be expanded, this analysis may be performed before the expandable decision is made. If it is determined that the context of an expandable path indicates that the order does not matter, then the determination of whether an expandable path should be expanded is unnecessary.

There are numerous contexts in which an expandable path may appear and in which the order of the nodes identified by the expandable path does not need to be preserved. For example, the order of selected nodes does not need to be preserved when an expandable path appears within a conditional branch of a query. In this scenario, while the existence of the selected nodes is relevant, the order within the XML data is returned is not. Specific examples of conditional branches include a WHERE clause, a CASE WHEN operator, an explicit XPath predicate, an EXISTNODE operator of an XQuery expression, and an XMLEXISTS operator of an SQL/XML query.

Another context in which an expandable path may appear but in which the order of selected nodes is irrelevant is in an aggregate function. For example, a count( ) or max( ) operator on top of an XML extraction query indicates that order preservation of the selected nodes is irrelevant because no actual XML data is presented to the user. Other non-limiting examples of aggregate functions include sum( ), min( ), and ave( ).

Another context in which an expandable path may appear but in which the order of selected nodes is irrelevant is an XMLTable operator in an SQL/XML query. An XMLTable operator takes an XML fragment as input and processes the XML fragment to emulate a relational table. Because relational tables do not have an order by definition, expandable paths that appear in an XMLTable operator do not need to be expanded.

By determining the context in which an expandable path appears, many XML queries that contain expandable paths may be rewritten even though the order of the nodes cannot be guaranteed. Without determining the context of expandable paths, many XML queries would not be rewritten that would have otherwise benefited from rewriting.

One way to determine the context of an expandable path is to create an abstract syntax tree (AST) based on the XML query. An AST comprises nodes and links and represents one or more SQL functions. Each node represents an operation to perform and each link between two nodes represents a flow of data between the two nodes. If a node in an AST corresponds to a path contained in an XML query, then the SQL function represented by the node indicates a retrieval of the data indicated by the path.

The context of a node that corresponds to a path depends on how the result of the SQL operation that corresponds to that node is "consumed" or processed by another operator in the AST. For example, if the result of retrieving the data indicated by expandable path "//item" is consumed by the aggregate function count( ), then determining whether order is guaranteed is irrelevant for the user. However, if the result (or a portion thereof) of retrieving the XML data indicated by expandable path "//item" is returned as the final result of the XML query, then determining whether order is guaranteed is relevant and the order must be preserved.

By taking into account the context of expandable paths, XML queries that include multiple expandable paths may be optimized even though path expansion is not valid for one or more of the multiple expandable paths. For example, if (1) an XML query includes multiple expandable paths, (2) path expansion is valid for less than all of the expandable paths, and (3) the context of each of the expandable paths for which path expansion is not valid indicates that the order of the nodes is irrelevant, then each of the expandable paths in the XML query may be expanded.

Additional Optimizations Related to Path Expansion

In an embodiment, additional one or more criteria are identified before ultimately determining to expand an expandable path. The one or more criteria may include a threshold number of expanded paths that may be generated based on an expandable path. The threshold number of expanded paths indicates that rewriting an XML query with an expandable path (or processing a rewritten query with multiple expanded paths) might be more costly (in terms of computing resources such as CPU cycles and memory) than processing the XML query without expanding the expandable path. For example, if expanding "//item" results in 400 expanded paths, then a rewriting the corresponding XML query might result in 400 different queries. The results of each different query would then need to be combined.

Comparing the number of expanded paths that may result from an expandable path to the threshold number may be performed any time before it is ultimately determined to expand an expandable path. Alternatively, this comparison is performed before the determination of whether an order can be derived from an XML schema because the determination of the number of expanded paths and the comparison to the threshold number may require less computing resources than determining whether an order can be derived.

Another criterion that may be identified before ultimately determining to expand an expandable path is the total size of the one or more XML documents that are targeted by the expandable path. The size of an XML document may indicate the size of the XML document stored in object-relational form (i.e., as it is shredded into multiple tables on disk) or the size of the XML document after it is constructed and stored in volatile memory as a DOM tree. If the total size of the set of one or more XML documents does not exceed a threshold size, then the XML query is not rewritten to expand an expandable path.

Comparing the total size of the set of one or more XML documents to the threshold size may be performed any time before it is ultimately determined to expand an expandable path. Alternatively, this comparison is performed before the determination of whether an order can be derived from an XML schema because the determination of the total size of the set of one or more documents and the comparison to the threshold size may require less computing resources than determining whether an order can be derived.

Replacing Order Operators with Constant Values

As described above, path expansion is one possible optimization of an XML query. An additional optimization is to replace an order operator in an XML query with a constant Boolean value of TRUE or FALSE. Non-limiting examples of such order operators include "op:node-after(A,B)" and "op:node-before(A,B)." These order operators may be represented, respectively, in the following abbreviated syntax: "A>>B" and "A<<B." An order operator returns TRUE if and only if two selected nodes (or node sets) A and B appear in the order indicated in the parameter fields of the operator. If A and/or B are not simple paths, but instead may expand to multiple simple paths, then each simple path corresponding to A must appear before (or after, in the case of A>>B) each simple path corresponding to B. If A and B always appear in a well-defined order (e.g., an item's price always comes before the item's description), then the evaluation of the order operator can be optimized to a constant Boolean value TRUE or FALSE.

Determining whether to rewrite an XML query by replacing an order operator (in the XML query) with a constant Boolean value requires steps similar to those described above relative to path expansion. For example, an XML query includes paths 'A' and 'B' that identify, respectively, nodes A and B. Path 'A' and path 'B' are compared to identify one or more shared nodes. The corresponding XML schema is used to determine the content model of each shared node. If the result of the analysis of the content model is, e.g., "order is irrelevant," then the result of the order operator will always be FALSE because nodes A and B will never appear in the same XML document.

If A always comes before B, then op:node-before(A,B) and op:node-after(B,A) will be optimized to (or replaced with) TRUE. If B always comes before A, then op:node-before(A,B) and op:node-after(B,A) will be optimized to (or replaced with) FALSE.

If the order between A and B is not guaranteed (e.g., "no order between A and B"), then the order operators will have to be evaluated directly on the XML documents. In other words, the order operators cannot be replaced with a Boolean value.

This optimization of replacing order operators with Boolean values may be performed regardless of the XML storage model. For example, this optimization may be performed if XML data is stored relationally, in a binary format, in a text format, or materialized as one or more DOM trees.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
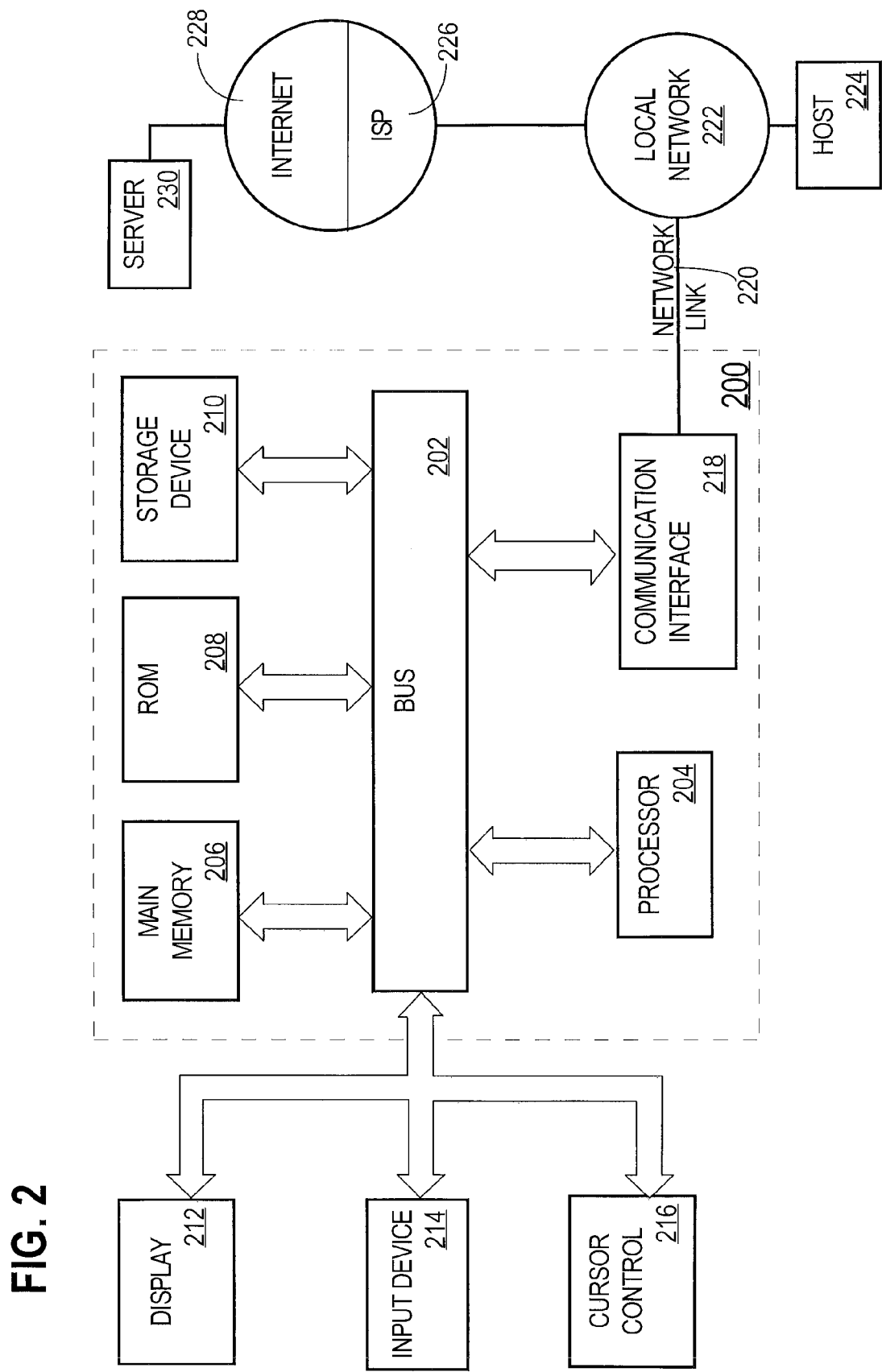
FIG. 2 is a block diagram that illustrates a computer system upon which an embodiment of the invention may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hardwired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   identifying a set of one or more shared nodes, wherein each node in the set of one or more shared nodes is specified within both a first path and a second path that is different than the first path;
   wherein the first path and the second path are simple path expressions and are associated with an XML query;
   for each shared node in the set of one or more shared nodes, using an XML schema to determine whether each child node of said each shared node is guaranteed to appear in a particular order, relative to one or more sibling nodes of said each child node, in each XML document that conforms to the XML schema; and
   when it is determined, using the XML schema, that each child node of each shared node in the set of one or more shared nodes is guaranteed to appear in a particular order, relative to one or more sibling nodes of said each child node, in each XML document that conforms to the XML schema, rewriting the XML query to generate a rewritten XML query;
   wherein the method is performed by one or more computing devices.

2. One or more storage media storing instructions which, when executed by one or more processors, cause performance of:
   identifying a set of one or more shared nodes, wherein each node in the set of one or more shared nodes is specified within both a first path and a second path that is different than the first path;
   wherein the first path and the second path are simple path expressions and are associated with an XML query;
   for each shared node in the set of one or more shared nodes, using an XML schema to determine whether each child node said each shared node is guaranteed to appear in a particular order, relative to one or more sibling nodes of said each child node, in each XML document that conforms to the XML schema; and
   when it is determined, using the XML schema, that each child node of each shared node in the set of one or more shared nodes is guaranteed to appear in a particular order, relative to one or more sibling nodes of said each child node, in each XML document that conforms to the XML schema, rewriting the XML query to generate a rewritten XML query.

3. The method of claim 1, wherein:
the XML query does not include the first path and the second path;
the method further comprising:
 identifying, in the XML query, a particular path expression that corresponds to a plurality of simple path expressions;
 using the XML schema to generate, based on the particular path expression, the plurality of simple path expressions;
the first path and the second path are in the plurality of simple path expressions;
the rewritten XML query includes the first path and the second path.

4. The method of claim 3, further comprising:
when it is determined that the child nodes of each shared node in the set of one or more shared nodes are not guaranteed to appear in a particular order in each XML document that conforms to the XML schema, determining to not rewrite the XML query to generate the rewritten XML query that includes the first path and the second path.

5. The method of claim 1, further comprising:
analyzing a second XML query that includes a second particular path expression;
determining a context in which the second particular path expression appears in the second XML query; and
in response to determining that the context indicates that the second particular path expression appears in a WHERE clause, a CASE WHEN operator, an XMLExists operator, an XMLTable operator, an EXISTNODE operator, or an aggregate function, rewriting the second XML query to generate a second rewritten XML query without using any XML schema to determine whether child nodes of each shared schema node in the second rewritten XML query are guaranteed to appear in a particular order in one or more XML documents.

6. The method of claim 1, further comprising:
analyzing a second XML query that includes a second particular path expression;
wherein the second particular path expression corresponds to a second plurality of simple path expressions that includes a first particular path and a second particular path;
determining whether a total size of all XML documents that contain XML data that the second particular path expression indicates is less than a particular threshold size; or
determining whether a number of expressions in the second plurality of simple path expressions exceeds a particular threshold number;
in response to determining (a) that the total size is less than the particular threshold size or (b) that the number exceeds the particular threshold number, then determining to not rewrite the second XML query to generate a rewritten second XML query that includes the first particular path and the second particular path.

7. The method of claim 1, wherein:
the XML query indicates a first node that is identified by the first path;
the XML query indicates a second node that is identified by the second path;

the XML query includes an order operator that indicates the first node and the second node; and
the rewritten XML query replaces the order operator with a Boolean value.

8. The method of claim 1, wherein:
using the XML schema comprises using the XML schema to determine a content model of said each shared node; and
determining whether each child node of said each shared node is guaranteed to appear in a particular order, relative to one or more sibling nodes of said each child node, in each XML document that conforms to the XML schema is based on the content model of said each shared node.

9. The one or more storage media of claim 2, wherein:
the XML query does not include the first path and the second path;
wherein the instructions, when executed by the one or more processors, further cause:
 identifying, in the XML query, a particular path expression that corresponds to a plurality of simple path expressions, and
 using the XML schema to generate, based on the particular path expression, the plurality of simple path expressions;
the first path and the second path are in the plurality of simple path expressions;
the rewritten XML query includes the first path and the second path.

10. The one or more storage media of claim 9, wherein the instructions, when executed by the one or more processors, further cause:
when it is determined that the child nodes of each shared node in the set of one or more shared nodes are not guaranteed to appear in a particular order in each XML document that conforms to the XML schema, determining to not rewrite the XML query to generate the rewritten XML query that includes the first path and the second path.

11. The one or more storage media of claim 2, wherein the instructions, when executed by the one or more processors, further cause:
analyzing a second XML query that includes a second particular path expression;
wherein the second particular path expression corresponds to a second plurality of simple path expressions that includes a first particular path and a second particular path;
determining whether a total size of all XML documents that contain XML data that the second particular path expression indicates is less than a particular threshold size; or
determining whether a number of expressions in the second plurality of simple path expressions exceeds a particular threshold number;
in response to determining (a) that the total size is less than the particular threshold size or (b) that the number exceeds the particular threshold number, then determining to not rewrite the second XML query to generate a rewritten second XML query that includes the first particular path and the second particular path.

12. The one or more storage media of claim 2, wherein:
the XML query indicates a first node that is identified by the first path;
the XML query indicates a second node that is identified by the second path;

the XML query includes an order operator that indicates the first node and the second node; and the rewritten XML query replaces the order operator with a Boolean value.

13. The one or more storage media of claim 2, wherein:
using the XML schema comprises using the XML schema to determine a content model of said each shared node; and determining whether each child node of said each shared node is guaranteed to appear in a particular order, relative to one or more sibling nodes of said each child node, in each XML document that conforms to the XML schema is based on the content model of said each shared node.

14. The method of claim 3, further comprising, before using the XML schema:
determining a context in which the particular path expression appears in the XML query; and
determining whether to use the XML schema based on the context of the particular path expression.

15. The method of claim 3, wherein the particular path expression includes a wildcard character or a descendant axis.

16. The method of claim 7, further comprising:
when it is determined that the child nodes of said each shared node are not guaranteed to appear in a particular order in each XML document that conforms to the XML schema, determining to not rewrite the XML query to generate a rewritten XML query that replaces the order operator with a Boolean value.

17. The method of claim 8, wherein using the XML schema comprises:
determining whether the content model of said each shared node is 'ALL';
in response to determining that the content model of said each shared node is 'ALL', determining that each child node of said each shared node is not guaranteed to appear in a particular order, relative to one or more sibling nodes of said each child node, in each XML document that conforms to the XML schema.

18. The method of claim 8, wherein using the XML schema comprises:
determining whether the content model of said each shared node is 'SEQUENCE' or 'CHOICE';
in response to determining that the content model of said each shared node is 'SEQUENCE' or 'CHOICE', determining the maximum occurrence of each child node of said each shared node;
if it is determined that the maximum occurrence of each child node of said each shared node is not greater than one, then determining that each child node of said each shared node is guaranteed to appear in a particular order, relative to one or more sibling nodes of said each child node, in each XML document that conforms to the XML schema; and
if it is determined that the maximum occurrence of at least one child node of said each shared node is greater than one, then determining that each child node of said each shared node is not guaranteed to appear in a particular order, relative to one or more sibling nodes of said each child node, in each XML document that conforms to the XML schema.

19. The one or more storage media of claim 9, wherein the instructions, when executed by the one or more processors, further cause, before using the XML schema:

determining a context in which the particular path expression appears in the XML query; and
determining whether to use the XML schema based on the context of the particular path expression.

20. The one or more storage media of claim 9, wherein the particular path expression includes a wildcard character or a descendant axis.

21. The one or more storage media of claim 10, wherein the instructions, when executed by the one or more processors, further cause:
analyzing a second XML query that includes a second particular path expression;
determining a context in which the second particular path expression appears in the second XML query; and
in response to determining that the context indicates that the second particular path expression appears in a WHERE clause, a CASE WHEN operator, an XMLExists operator, an XMLTable operator, an EXISTNODE operator, or an aggregate function, rewriting the second XML query to generate a second rewritten XML query without using any XML schema to determine whether child nodes of each shared schema node in the second rewritten XML query are guaranteed to appear in a particular order in one or more XML documents.

22. The one or more storage media of claim 12, wherein the instructions, when executed by the one or more processors, further cause:
when it is determined that the child nodes of said each shared node are not guaranteed to appear in a particular order in each XML document that conforms to the XML schema, determining to not rewrite the XML query to generate a rewritten XML query that replaces the order operator with a Boolean value.

23. The one or more storage media of claim 13, wherein using the XML schema comprises:
determining whether the content model of said each shared node is 'ALL';
in response to determining that that the content model of said each shared node is 'ALL,' determining that each child node of said each shared node is not guaranteed to appear in a particular order, relative to one or more sibling nodes of said each child node, in each XML document that conforms to the XML schema.

24. The one or more storage media of claim 13, wherein using the XML schema comprises:
determining whether the content model of said each shared node is 'SEQUENCE' or 'CHOICE';
in response to determining that the content model of said each shared node is 'SEQUENCE' or 'CHOICE', determining the maximum occurrence of each child node of said each shared node;
if it is determined that the maximum occurrence of each child node of said each shared node is not greater than one, then determining that each child node of said each shared node is guaranteed to appear in a particular order, relative to one or more sibling nodes of said each child node, in each XML document that conforms to the XML schema; and
if it is determined that the maximum occurrence of at least one child node of said each shared node is greater than one, then determining that each child node of said each shared node is not guaranteed to appear in a particular order, relative to one or more sibling nodes of said each child node, in each XML document that conforms to the XML schema.

* * * * *

UNITED STATES PATENT AND TRADEMARK OFFICE
CERTIFICATE OF CORRECTION

PATENT NO. : 9,477,778 B2            Page 1 of 1
APPLICATION NO. : 12/545737
DATED : October 25, 2016
INVENTOR(S) : Hammerschmidt et al.

It is certified that error appears in the above-identified patent and that said Letters Patent is hereby corrected as shown below:

In Column 9, Line 53, delete "ave( )." and insert -- avg ( ). --, therefor.

In Column 18, Line 37, in Claim 23, delete "that that" and insert -- that --, therefor.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*